July 14, 1925.
H. E. WARREN
1,546,269
SELF STARTING SYNCHRONOUS MOTOR
Filed Sept. 11, 1922
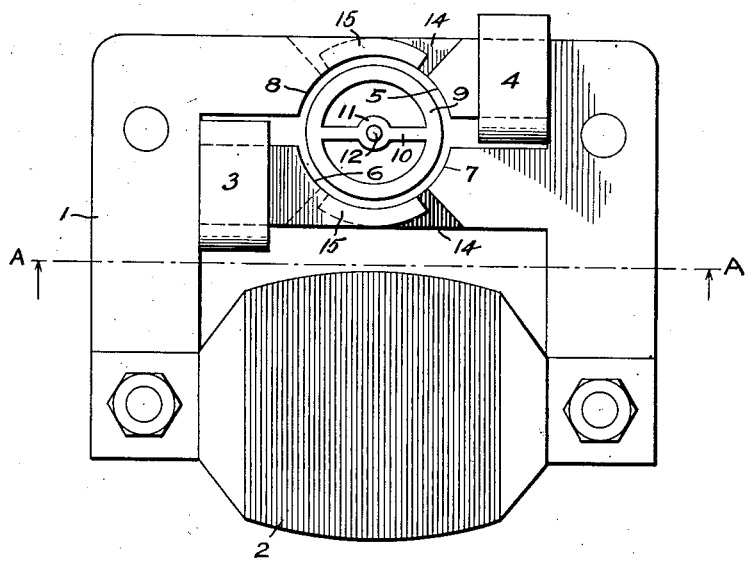
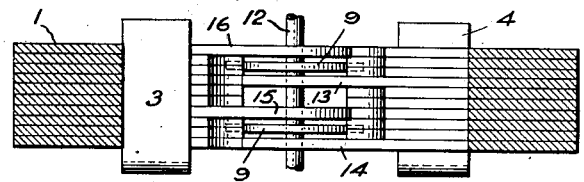
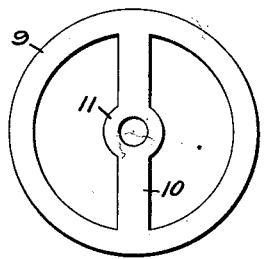 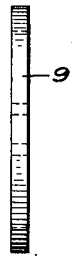
Inventor:
Henry E. Warren,
by *Albert G. Davis*
His Attorney Patented July 14, 1925.

1,546,269

UNITED STATES PATENT OFFICE.

HENRY E. WARREN, OF ASHLAND, MASSACHUSETTS, ASSIGNOR TO WARREN CLOCK COMPANY, A CORPORATION OF MAINE.

SELF-STARTING SYNCHRONOUS MOTOR.

Application filed September 11, 1922. Serial No. 587,276.

*To all whom it may concern:*

Be it known that I, HENRY E. WARREN, a citizen of the United States, residing at Ashland, county of Middlesex, State of Massachusetts, have invented certain new and useful Improvements in Self-Starting Synchronous Motors, of which the following is a specification.

My invention relates to self-starting synchronous motors and more in particular to improvements in the rotor of such motors as is described in my copending application, Serial No. 521,590 entitled "Self-starting synchronous motors" filed December 12, 1921, and assigned to the same assignee as the present invention.

The motor described in the above mentioned application comprises a stationary alternating current field member having interleaved shaded pole pieces for producing a rotating magnetic field and a rotor mounted within said field consisting of one or more split rings of permanent magnet material suitably supported on a spider and shaft. This rotor is capable of starting from rest and revolving in exact synchronism with the rotating magnetic field.

The motor of my present application comprises means for producing a rotating magnetic field preferably similar to the means described in application, Serial No. 521,590 and a rotor made of one or more symmetrical stampings of permanent magnet material which have the self-starting and synchronizing characteristics of the split ring rotor above referred to, but which do not require a separate spider for their support. The rotor of my present application combines in an integral structure a continuous ring with radial arms arranged on the polar axes, said arms producing the synchronizing characteristics and constituting the rotor spider. This construction always produces a mechanically balanced rotor irrespective of the number of rotor units used on the same shaft. In the bi-polar, or preferred form, the synchronizing portion of the rotor comprises a diametrically disposed bar. This type of rotor combines the self-starting characteristics of a ring and the synchronizing characteristics of a bar in a single member. The characteristics of the motor may be altered by changing the relative dimensions of the ring and polar portions of the rotor. Furthermore, I have found that at rest the predominant characteristic is dependent upon the degree of saturation of the rotor so that the desired characteristics may be made selective to some extent by varying the terminal voltage. Other advantages of my improved motor will appear as the description proceeds.

The features of my invention which I believe to be novel and patentable will be pointed out in the claims appended hereto. The details of construction and manner of operation of my improved motor will now be explained in connection with the accompanying drawing in which Fig. 1 illustrates an end view of a bi-polar motor with the rotor in place; Fig. 2 represents a sectional view taken on line A—A of Fig. 1 looking in the direction of the rotor; Fig. 3 shows an end view of the rotor member removed; and Fig. 4 shows a plan view of the same.

Referring to Fig. 1, I have shown a type of self-starting synchronous motor in which a bi-polar field magnet 1 is provided with a single phase energizing winding 2 and with shading coils 3 and 4 for causing a time lag of the magnetic flux in pole faces 5 and 6 behind that in the pole faces 7 and 8. The rotor element comprises one or more stampings of sheet steel or other permanent magnetic material each consisting of a continuous ring 9 with a bar 10 across one diameter. The center of the bar is enlarged and provided with an opening to form a hub 11 for concentrically mounting the rotor on a shaft 12. This type of rotor requires no additional spider structure, is mechanically balanced and is very inexpensive since the entire rotor element may be stamped from sheet metal by one operation and then pressed or otherwise fastened on the shaft.

The ring portion of such a structure when placed in a rotating magnetic field has strong starting characteristics and weak synochronizing characteristics similar to that of an induction motor. The bar or polar portion, however, has a strong tendency to remain at rest but when once brought up to near synchronous speed with the rotating magnetic field, it becomes permanently magnetized and has strong synchronizing characteristics similar to that of a straight synchronous motor. When at rest the rotor position of least reluctance is that shown in Fig. with the bar portion and ring forming parallel paths for the magnetic flux and this is the position the rotor will take in a weak field. In a rotating magnetic field such as produced by the field structure here shown when at rest the ring portion attempts to follow the rotating field but the bar portion tends to maintain its position of least reluctance. I have found that the behavior of the rotor at rest apparently depends upon the relative amount of magnetism necessary to saturate the bar and ring portions. Thus, I have found that with a comparatively weak field of the proper form for the operation of the motor, this rotor will not start. It tends to behave like a plain bar occupying the position of least reluctance due, I believe, to the fact that the major portion of the flux passes through the bar. As the strength of the alternating magnetic field is increased, the bar portion becomes saturated and a greater proportion of the flux passes through the ring until a point is reached where the tendency of the bar to resist rotation is overcome by the tendency of the ring to rotate, which causes the rotor to start and then, of course, it very quickly reaches synchronous speed. In still stronger fields, the tendency to start is greatly increased so that the opposition of the bar to starting becomes comparatively negligible. After synchronous speed is reached the motor voltage may be reduced to a value below that necessary to start the motor without reducing the motor speed. It will thus be seen that this feature makes possible the use of my motor as a selective device on a variable voltage alternating current system. Furthermore, by suitably proportioning the relative cross-sectional areas of the bar and ring portions of different motors on the same system, said motors may be made to start at different selective voltages.

The preferred type of field structure for producing the rotating magnetic field is described and claimed in my co-pending application Serial No. 521,590 above referred to. This field is built of laminations as shown in Fig. 2 and has polar projections 5, 6, 7 and 8 in which all of the laminations are used. There is a very considerable air gap from the solid pole piece 5 to the solid pole piece 8 and likewise between pole pieces 6 and 7. Across this gap a few of the laminations are allowed to overlap as 13 and 14 from the right hand portion of the field and 15 and 16 from the left hand portion. A suitable air gap is provided between and around these overlapping laminations so as not to short circuit the opposite sides of the field and so as to leave a zone around the rotor in which the magnetic lines from one pole are somewhat mixed with the magnetic lines from the opposite pole. The magnetism in poles 5 and 6 lags somewhat behind that in the unshaded poles 7 and 8, but this angle of lag is considerably less than 90 degrees. Owing, however, to the mixed magnetism in the zone where the laminations overlap, there is a tendency to produce there a field which lags still further behind that in 5 because the lag of the pole 8 is 180 degrees behind 7. In the construction described the overlapping laminations produce a more nearly uniform rotating magnetic field than the usual construction where the overlapping portions are omitted.

With this construction it is feasible to use several rotor stampings on the same shaft separated by a sufficient distance to maintain the desired relation of flux density in the rotor and overlapping stator sections. In Fig. 2 I have shown two rotor elements 9 arranged on the same shaft with the bar portions parallel or substantially so. However, I do not wish to be limited to any particular number of rotor elements. For many purposes one rotor element will be found to give sufficient torque and for greater torques additional rotor elements may be added, increasing the width of the stator element proportionately.

The following dimensions have been found to be satisfactory for ordinary purposes. The diameter of the pole pieces of the field 5/8"; outside diameter of the rotor 1/2"; width of ring portion 3/64"; width of bar portion 1/16"; and thickness of rotor 3/32". The material used for the ring was six percent tungsten magnet steel. I do not wish, however, to be limited to these dimensions or to this exact dimensional relation or to the specific material mentioned, but seek to cover in the appended claims all modifications coming fairly within the true scope and spirit of my invention, including the multi-polar motor wherein the polar portions of the rotor consist of radial arms disposed on the polar axes of the motor.

What I claim as new and desire to secure by Letters Patent of the United States is:—

1. A self starting synchronous motor provided with means for producing a rotating magnetic field and having a rotor consisting of one or more continuous rings of magnetic material each provided with integral radial arms equal in number to the poles of the motor and disposed on polar axes.

2. A self starting synchronous motor provided with means for producing a bi-polar substantially uniform rotating magnetic field and having a rotor consisting of one or more continuous rings of permanent magnet steel each provided with an integral bar across a diameter thereof forming a spider.

3. A self starting synchronous motor provided with means for producing a substantially uniform, rotating magnetic field a rotor for said motor comprising a plurality of spaced mechanically balanced rings of permanent magnet steel each provided with an integral bar across a diameter thereof, and a shaft for said motor, said bars being secured on said shaft substantially in a plane.

4. A self starting synchronous motor comprising a laminated field magnet provided with an exciting winding and cooperating, partially shaded polar projections having spaced, overlapping laminations extending from the faces thereof for producing a mixed field between the shaded and unshaded portions of adjacent pole faces, and a rotor between said pole faces, said rotor comprising one or more mechanically balanced rings of permanent magnet steel each provided with an integral bar across a diameter thereof.

5. A rotor for a self starting synchronous motor consisting of one or more balanced rings of permanent magnet steel each provided with integral radial arms equal in number to the poles of the motor and disposed on polar radii said rings forming the starting member and said radial arms the synchronizing member of said rotor.

6. A bi-polar rotor for a self starting synchronous motor comprising one or more continuous rings of permanent magnetic steel each provided with an integral bar across a diameter thereof, the central portion of said bars being enlarged to form a hub.

7. In a self starting synchronous motor a rotor element consisting of a continuous ring of permanent magnet steel provided with integral radial arms disposed on polar radii, the cross-sectional area of said ring and arms being substantially the same.

8. A self starting synchronous motor comprising means for producing a rotating magnetic field, a rotor disposed in said field having portions for producing starting and synchronizing characteristics respectively, so arranged and proportioned that the rotor flux takes parallel paths therethrough at starting to produce opposing torques, the torque of said portion having the starting characteristics predominating only after said other portion becomes magnetically saturated.

9. A self starting synchronous motor comprising means for producing a substantially circular rotating magnetic field, a rotor disposed in said field having portions for producing starting and synchronizing characteristics respectively, so arranged and proportioned that the rotor flux takes parallel paths therethrough at starting, the portion having the synchronizing characteristics having the least reluctance whereby said rotor will start only after said last mentioned portion becomes magnetically saturated.

In witness whereof, I have hereunto set my hand this 30th day of Aug. 1922.

HENRY E. WARREN.